US008659283B2

(12) United States Patent
Waltisperger et al.

(10) Patent No.: US 8,659,283 B2
(45) Date of Patent: Feb. 25, 2014

(54) CONVERTER CIRCUIT

(75) Inventors: Guy Waltisperger, Grenoble (FR); Jerome Willemin, Tullins (FR)

(73) Assignee: Commissariat a l'Energies Atomique et aux Energies Alternatives, Paris (FR)

( * ) Notice: Subject to any disclaimer, the term of this patent is extended or adjusted under 35 U.S.C. 154(b) by 299 days.

(21) Appl. No.: 13/152,743

(22) Filed: Jun. 3, 2011

(65) Prior Publication Data

US 2011/0298441 A1    Dec. 8, 2011

(30) Foreign Application Priority Data

Jun. 4, 2010 (FR) .................................... 10 54424

(51) Int. Cl.
*G05F 1/67* (2006.01)
(52) U.S. Cl.
USPC ............................................. 323/299; 307/86
(58) Field of Classification Search
USPC ............. 323/299, 906; 136/243–265; 307/86; 320/101; 700/286, 287, 291, 297; 702/60, 64
See application file for complete search history.

(56) References Cited

U.S. PATENT DOCUMENTS

| 5,362,994 | A  | * | 11/1994 | Lin ................................... 327/72 |
| 5,493,155 | A  | * | 2/1996  | Okamoto et al. ............. 323/299 |
| 5,838,148 | A  | * | 11/1998 | Kurokami et al. ............ 323/299 |
| 8,054,658 | B2 | * | 11/2011 | Chiu et al. ...................... 363/59 |
| 8,339,112 | B2 | * | 12/2012 | Rua et al. ....................... 323/222 |
| 8,390,242 | B2 | * | 3/2013  | Liu .................................. 320/101 |
| 2006/0197579 | A1 | * | 9/2006  | Kanno et al. ................... 327/333 |
| 2007/0024257 | A1 | * | 2/2007  | Boldo ............................. 136/244 |
| 2008/0111517 | A1 | * | 5/2008  | Pfeifer et al. .................. 320/101 |
| 2010/0085786 | A1 | * | 4/2010  | Chiu et al. ...................... 363/59 |
| 2010/0263711 | A1 | * | 10/2010 | Kanai ............................. 136/246 |
| 2011/0109346 | A1 | * | 5/2011  | Moussaoui et al. ............ 327/60 |

FOREIGN PATENT DOCUMENTS

| EP | 0090212 | 10/1983 |
| WO | 2007/039091 | 4/2007 |

OTHER PUBLICATIONS

Pandey et al. "A Simple Single-Sensor MPPT Solution" *IEEE Transactions on Power Electronics*, 22(2): 698-700 (Mar. 2007).

* cited by examiner

*Primary Examiner* — Adolf Berhane
*Assistant Examiner* — Jye-June Lee
(74) *Attorney, Agent, or Firm* — Occhiuti & Rohlicek LLP (57) ABSTRACT

A converter circuit to be connected to an electrical energy source capable of showing major fluctuations in delivered power includes a chopper circuit with a variable duty cycle and connectable to the electrical energy source, an output circuit adapted for connection to the chopper circuit, a control loop for tracking an MPP of the energy source connected to an output of the energy source, and a control unit configured to command, at predefined intervals, changes in the chopper circuit's duty cycle as a function of the control loop's set-value signal. The control loop includes means for analog storage of pieces of information corresponding to output voltages from the energy source for at least three successive duty cycles, and an analog comparison unit delivering an output, as a function of the stored pieces of information, and a set-value signal for increasing or reducing of the duty cycle by the control unit.

16 Claims, 6 Drawing Sheets

CONVERTER CIRCUIT

RELATED APPLICATIONS

Under 35 USC 119, this application claims the benefit of the priority date of French application FR-1054424, filed on Jun. 4, 2010, the contents of which are herein incorporated by reference.

FIELD OF DISCLOSURE

The present invention pertains to a converter circuit and to an electronic system comprising such a circuit.

BACKGROUND OF THE INVENTION

The development of photovoltaic panels has significantly expanded in recent years with a view to the constantly increasing use of renewable energy sources in order to reduce the harmful greenhouse effect caused especially by carbon dioxide emissions.

This is also true of renewable energy sources such as wind or thermo-electrical sources.

These energy sources have the special feature wherein the electrical energy that they provide varies greatly according to the natural phenomena that supply them. Furthermore, a photovoltaic generator is a generator whose characteristic I=f(U) is highly non-linear. Thus, for a same illumination value, the power delivered will be different depending on the load.

Thus, the efficiency, i.e. the power delivered by a photovoltaic cell, depends not only on its exposure to sunlight which varies during the day, but also for example on the concealment of sunlight, for example by shade cast by clouds or other meteorological phenomena.

Now, when photovoltaic cells are for example connected to a load such as a consumer (for example a sensor or again a battery to be recharged), it turns out that the power transferred to the load does not generally correspond to the maximum power that could be delivered by the cell. Similar problems can be noted for wind energy. The result of this is not only that the efficiency drops for example because of weaker sunlight, but also that this efficiency is adversely affected by an imposed operating point situated below the potential performance of the cell.

In order to overcome this drawback and produce energy that is constantly as close as possible to the optimum operating point, circuits are used implementing a method known as the maximum power point tracking (MPPT) method which has been known since 1968. This is a method providing a better connection between a non-linear source and an arbitrary load.

These circuits are designed to force the generator, for example the photovoltaic cell, to work at its maximum power point, thus inducing improved efficiency.

An MPPT controller therefore drives the static converter connecting the load (a battery for example) and a photovoltaic panel so as to permanently provide maximum power to the load.

There are known ways, for maximum power point or MPP tracking, of applying a method based on a "perturb-and-observe" (P&O) approach.

In the case of a photovoltaic application, this is in fact an algorithm which, for a fixed voltage U1, will measure the corresponding power value P1 delivered by the generator, and then, after a certain period of time, dictate a voltage $U2=U1+\Delta U$ and also measure the corresponding power value P2.

Thereafter, a voltage $U3=U2+\Delta U$, is imposed if P2 is greater than P1. If not $U3=U2-\Delta U$ is imposed.

However, this implies current measurements and also substantial computation resources, for which the energy consumption is not negligible. This is why, in a large-sized photovoltaic installation, a sub-group of cells is dedicated exclusively to providing the energy needed for the control of the MPPT circuit.

However, in electronic micro-systems, such as for example autonomous sensors, this approach is not acceptable because the constraints in terms of space requirement and weight are great and it is necessary to have a system that is as small as possible with increased autonomy.

There also exist known maximum power point tracking circuits that possess an additional driver cell. This is not always desirable.

There also exist MPPT circuits without driver cells based on open-circuit voltage sampling performed by disconnecting, at fixed frequency, the photovoltaic panel from the rest of the circuit to measure the voltage in an open circuit. The system then reconnects the panel to the harvesting circuit which has taken the new optimized parameters into account. However, this results in frequent interruption of the energy harvesting process, which is unacceptable for electronic micro-systems that have to be autonomous.

Finally, there is a method known from the article "A simple single-sensor MPPT solution" in IEEE *Transactions on Power Electronics*, Vol. 22, No. 2, March 2007, describing an MPPT tracking method based on measurements of voltages.

This article explains that the derivative of the operating voltage of the energy source as a function of the duty cycle has a maximum value around the maximum power point MPP. The result of this is that tracking the maximum value of this voltage derivative is equivalent to tracking the maximum power point.

Thus, through simple measurements of voltages and operations of subtraction and comparison, it is possible to make the converter work around the maximum power point MPP.

To this end, the duty cycle $\alpha$ is made to vary at predefined intervals, for example at about 10 Hz, by a predefined quantity $\Delta\alpha$, and the voltage derivative, i.e. the progress of the differences in voltages occurring after changes in the duty cycle, is tracked.

Now, in the above-mentioned article, this MPPT control loop is set up by means of a microcontroller.

SUMMARY OF THE INVENTION

Given the low quantity of energy available, the present invention seeks to further optimize energy expenditure in this control loop, especially in order to further optimize energy harvesting while at the same time enabling a substantial reduction of the space requirement of this system.

To this end, the present invention proposes a converter circuit designed to be connected to an electrical energy source liable to undergo major fluctuations in delivered power, the circuit comprising:

a chopper circuit with variable duty cycle connectable to the electrical energy source, and at least one output circuit adapted to being connected to the chopper circuit, a control loop working by the tracking of the maximum power point of the electrical energy source connected to an output of the variable energy source, and a control unit configured to control, at predefined intervals, changes in the duty cycle of the chopper circuit as a function of a set-value signal of the control loop, wherein the control loop comprises means for the analog storage of pieces of information corresponding to output voltages from the electrical energy source for at least three successive duty cycles and an analog comparison unit delivering at the output, as a function of the analogically stored pieces of information, a set-value signal for the increasing or reducing of the duty cycle by the control unit.

According to one or more characteristics of the converter circuit, taken alone or in combination:

According to one aspect, the means of analog storage of pieces of information corresponding to output voltages from the electrical energy source for at least three successive duty cycles comprise a first unit for determining a voltage differential for two successive first duty cycles and a second unit for determining a voltage differential for two second duty cycles, at least one of which is subsequent to the first successive duty cycles.

According to another aspect, each unit for determining a voltage differential for two successive duty cycles comprises at least one first branch and one second branch that are parallel, each branch comprising a capacitor and being connectable via at least one switch to the output of the energy source, the two capacitors being capable of being parallel-connected for a balancing of charges and providing a differential voltage for two successive duty cycles.

As an alternative, the means for the analog storage of pieces of information corresponding to output voltages from the electrical energy source for at least three successive duty cycles comprise a first branch comprising a capacitor configured for the storage, via switches, of the output voltages from the electrical energy source for a first and third successive duty cycles and a second branch comprising a capacitor configured to for the storage, via switches, of the charges corresponding to the output voltage of the electrical energy source for a second duty cycle, interposed between the first and third duty cycles, each branch being connected to a corresponding input of the analog comparison unit, the weight of the second branch being double that of the first branch.

Then, it is planned in a first variant that the first branch will be connected to the energy source via a divider bridge.

In a second variant, it is the second branch that has a switched circuit to double the charge of the capacitor for the second duty cycle.

In a more general aspect, the analog comparison unit is an operational amplifier configured as a comparator.

The control loop is configured for example to determine the voltages at an output of the energy source after a predefined stabilization time following a change in the duty cycle.

In another aspect, the control unit furthermore comprises means to control a change in the duty cycle by a quantity predefined as a function of the set-value signal of the control loop.

According to yet another aspect, the control unit is configured to command an increase in the duty cycle by a predefined quantity if the set-value signal has a positive polarity.

It is furthermore planned that the control unit will be configured for example to command an increase in the duty cycle by a predefined quantity if the set-value signal has a negative polarity.

Finally, according to another aspect, the control unit comprises only logic blocks.

An object of the invention is also an electronic system comprising at least one electrical energy source capable of showing major fluctuations and at least one converter circuit as defined here above connected to the at least one energy source.

According to one aspect, the source comprises at least one element of the following group formed by a photovoltaic cell, a wind generator, a thermo-electrical element.

BRIEF DESCRIPTION OF THE DRAWINGS

Other features and advantages of the invention shall appear from the following description as well as from the following figures of which.

DETAILED DESCRIPTION

Figure 1:
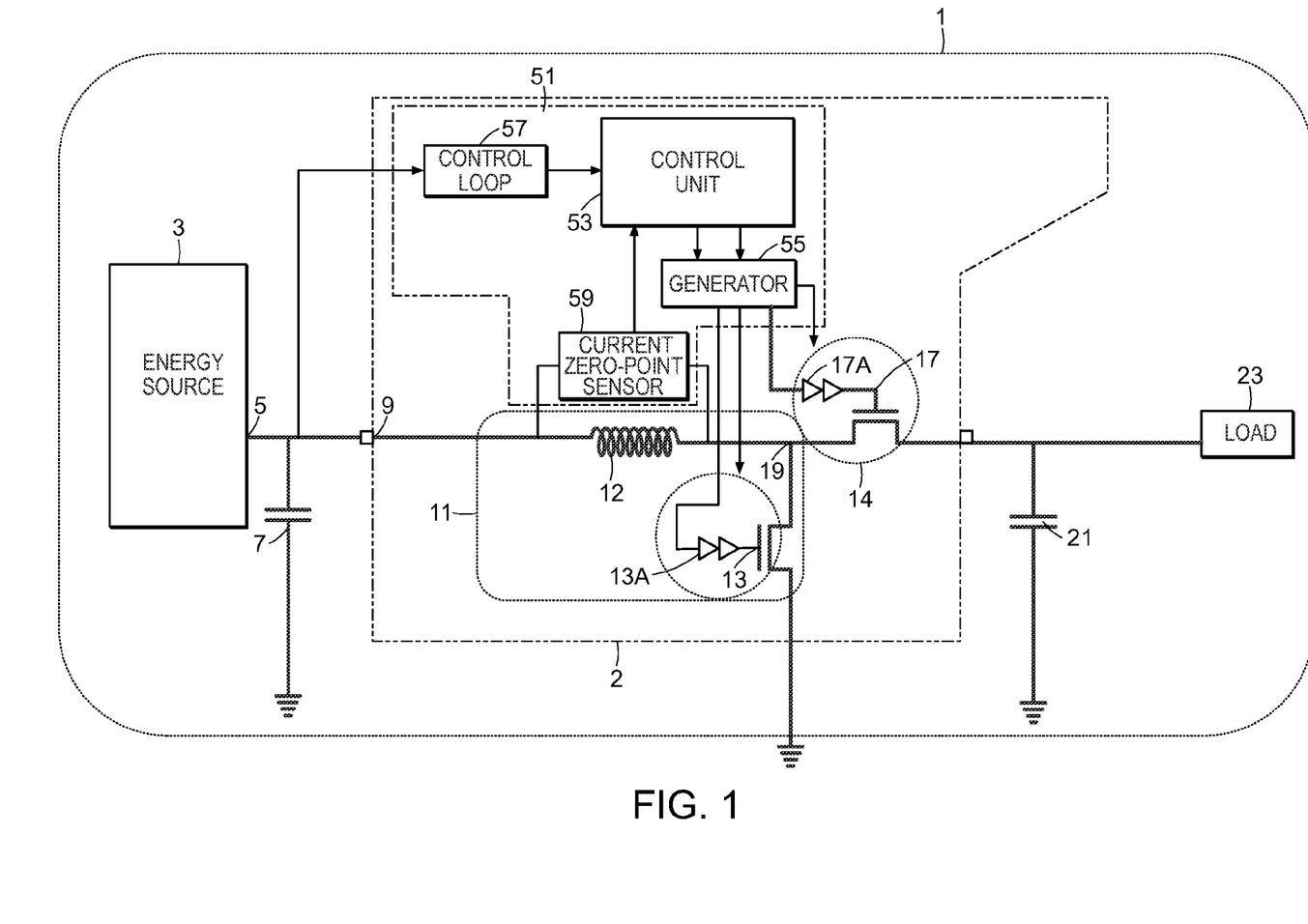
FIG. 1 is a block diagram of an electronic system comprising a converter circuit of the invention.

FIG. 1 is an example of a diagram of an electronic system 1 comprising a converter circuit 2 and an electrical energy source 3 connected to the converter circuit 2.

The electrical energy source 3 that can undergo major fluctuations in delivered power is for example a solar cell or panel, a thermo-electrical element or again a wind generator, especially a small-sized unit.

The term "major fluctuations" is understood to mean fluctuations by about a factor of 100 between the lowest power and the highest power capable of being delivered by such a source 3.

An output 5 of this source 3 is connected through a low-pass filter 7, made by a capacitor, to an input terminal 9 of the converter circuit 2.

The converter circuit 2 has a chopper circuit 11 with a variable duty cycle $\alpha$, the input terminal of which forms the input terminal 9 of the converter circuit 2 connected to the electrical energy source 3.

The chopper circuit 11 comprises an electrical energy accumulation inductor 12 and at least one chopper switch 13.

In FIG. 1, the electrical energy accumulation inductor 12 and the chopper switch 13 are arranged in a voltage booster configuration, i.e. the input of the inductor is connected to the source 3 and the output of the inductor 12 can be connected to ground if the switch 13 is "on" to enable a magnetic field to be set up about the inductor 12. The chopping frequency is for example 200 KHz.

According to one variant, which is not shown, the electrical energy accumulation inductor 12 and the chopper switch 13 may also be laid out in a voltage step-down configuration.

The converter circuit furthermore comprises an output circuit 14. Upstream, this output circuit 14 is connected via a switch 17 to an output terminal 19 of the chopper circuit 11. Downstream, this output circuit 14 is connected via a low-pass filter 21 to an electrical load 23 belonging to the electronic system 1.

The driving of the converter circuit 2 is done by a control circuit 51. This control circuit 51 has a control unit 53 controlling firstly the duty cycle α of the chopper circuit 11 and therefore that of its switch 13 and secondly the switching of the switch 17.

To this end, the control unit 53 includes a PWM (pulse-width modulation) output controlling a generator 55 for controlling the switches 13 and 17 (also called DTLC units or dead time control logic units).

With regard to the switch 13, it must be noted that it is an NMOS type transistor whose base is connected via one of the buffers (also called delay lines) 13A to the output of the generator 55.

For the switch 17, it is a PMOS transistor whose base is connected via buffers 17A to outputs associated with the generator 55.

The control circuit 51 furthermore has a control loop 57 that works by maximum power point tracking of the electrical energy source 3 connected to the output 5 of the variable energy source 3.

One output of the control loop 57 is connected to an input of the control unit 53. This control unit 53 is configured to command changes in the duty cycle α of the chopper circuit 11 at regular intervals as a function of a set-value signal of the control loop 57, as described in detail here below.

Given that the control loop 57 directly delivers a set-value signal to increase or reduce the duty cycle α, the control unit 53 can be made by simple logic blocks so that the converter circuit 2 no longer has any microprocessor, which is a major gain in cost as regards energy consumption and space requirement.

For the control of the switch 17 in particular, the control circuit 51 has a current zero-point sensor 59 to determine the cancellation of the current through the accumulation inductor 12, this sensor 59 delivering a signal to a corresponding input of the control unit 53.

According to one variant, which is not shown, it is possible to envisage replacing the current zero-point sensor by a diode with a very low voltage threshold parallel-mounted with a switch.

In operation, the control unit 53 controls the generator 55 so that:

when the switch 13 is closed (on), the switch 17 is open (off), when the switch 17 is closed (on), the switch 13 is open (off).

Thus, at a given point in time, only one of the switches 13 or 17 can be open.

The control circuit can be configured to control the chopper circuit 11 in a discontinuous mode of operation, i.e. where the current is periodically cancelled at the inductor 12.

A more detailed description shall now be provided of the control loop 57.

Figure 2:
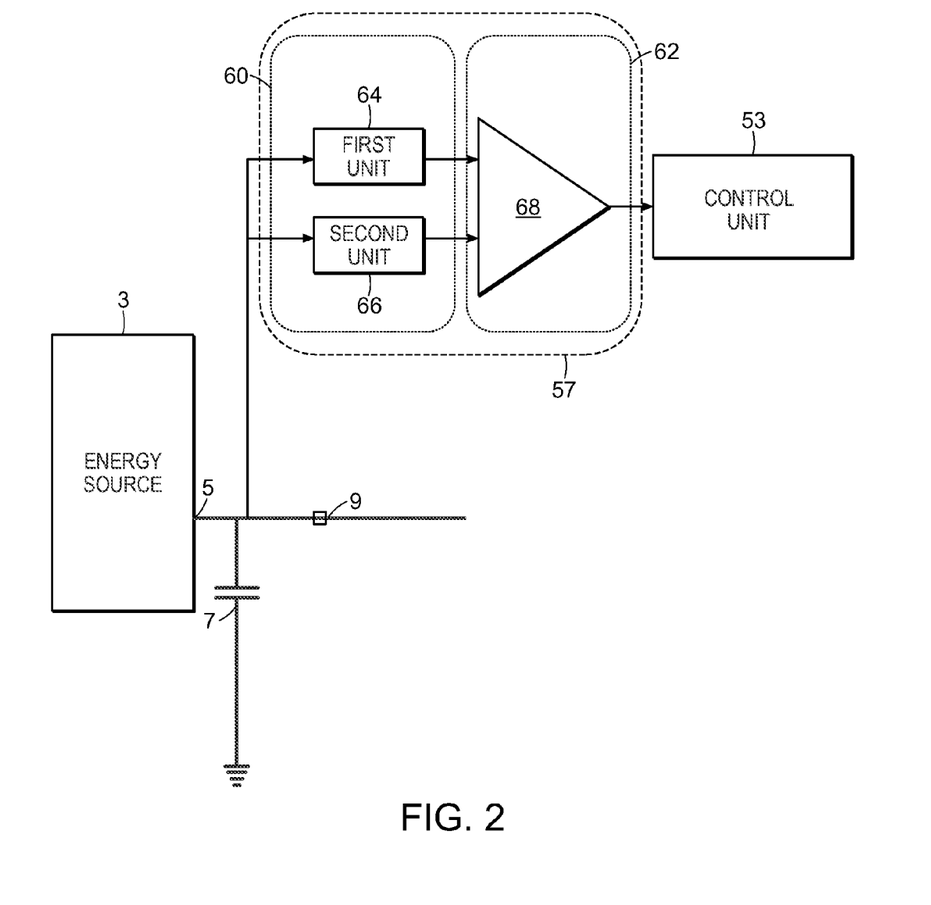
FIG. 2 is a detailed view of the converter circuit of FIG. 1 according to a first embodiment.

FIG. 2 gives a detailed view of FIG. 1.

The control loop 57 comprises means 60 for the analog storage of pieces of information corresponding to output voltages of the electrical energy source 3 for at least three successive duty cycles ($\alpha_{i-1}$, $\alpha_i$, $\alpha_{i+1}$) and an analog comparison unit 62, delivering at an output, from pieces of information stored in analog form, a set-value signal for increasing or reducing the duty cycle by the control unit 53.

In greater detail, the analog information storage means 60 comprises a first unit 64 for determining a voltage differential for two successive first duty cycles ($\alpha_{i-1}$, $\alpha_i$) and a second unit 66 for determining a voltage differential for two successive second duty cycles ($\alpha_i$, $\alpha_{i+1}$). For the sake of simplicity, the two units 64 and 66 will be chosen so as to be made identically.

However, the first unit 64 is configured to determine a first voltage differential for two successive first duty cycles ($\alpha_{i-1}$, $\alpha_i$). Thus, the first unit 64 determines:

$$\Delta V^i_S = |V_S(\alpha_i) - V_S(\alpha_{i-1})|$$

Whereas the second unit 66 is configured to determine a second voltage differential for two successive second duty cycles $\alpha_i$, $\alpha_{i+1}$, of which at least one ($\alpha_{i+1}$) is after the successive first duty cycles ($\alpha_{i-1}$, $\alpha_i$).

Thus, the second unit 66 determines:

$$\Delta V^{i+1}_S = |V_S(\alpha_{i+1}) - V_S(\alpha_i)|$$

The outputs of the two units 64 and 66 are connected to corresponding inputs of the analog comparison unit 62. This unit 62 is for example an operational amplifier 68 configured as a comparator. This comparator is for example a latched comparator making it possible to further restrict electricity consumption.

Figure 3:
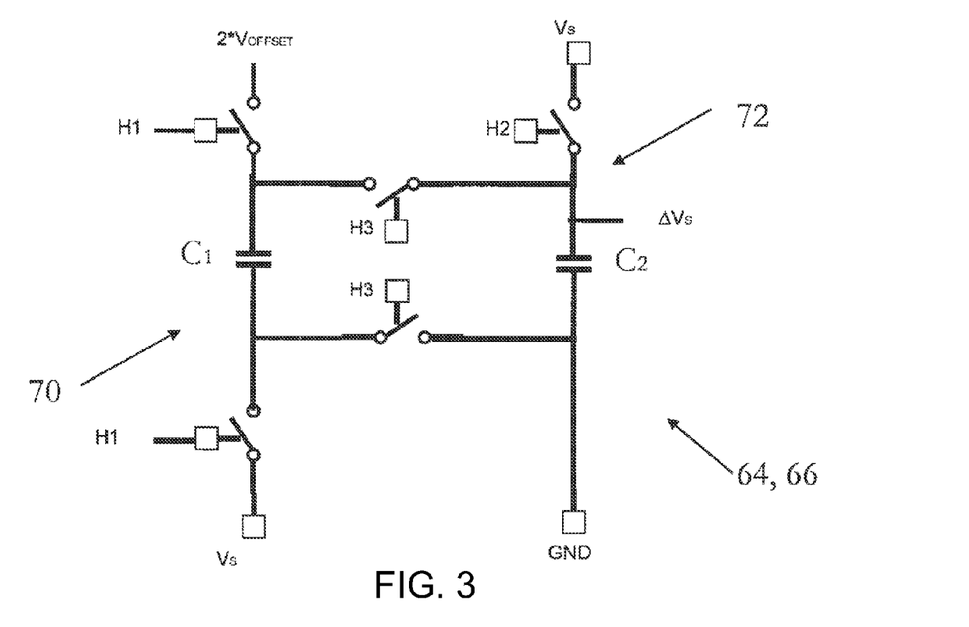
FIG. 3 shows a particular embodiment corresponding to the detailed view of FIG. 2.

FIG. 3 shows an example of an embodiment of a unit 64 or 66.

The general principle of the circuit of FIG. 3 is that it is possible, for a given instant, to store a first quantity of charges corresponding to a first output voltage $V_S$ of the energy source 3 in a first capacitor C1. Then, after changing the duty cycle α, a second quantity of charges corresponding to a second output voltage $V_S$ of the energy source 3 is stored for a given instant in a second capacitor C2. These capacitors C1 and C2 are then parallel-connected to set up a balancing of the charges stored in the two capacitors C1 and C2 that represents the difference between the two voltages corresponding to two different duty cycles.

Naturally, after each change in the duty cycle, a predefined stabilization time is awaited before these charges are tapped.

In greater detail, the unit 64 or 66 shown in FIG. 3 comprises at least one first branch 70 and one second branch 72 that are parallel connected.

Each branch 70, 72 respectively comprises a capacitor C1 or C2 of a same value.

The capacitor C1 can be connected, via two switches H1 when they are switched on, firstly to the output $V_S$ of the energy source 3 and secondly to the offset voltage $V_{OFFSET}$.

The capacitor C2 can be connected, via a switch H2 when it is switched on, firstly to the output $V_S$ of the energy source 3 and secondly to ground GND.

Then, the two branches 70 and 72 can be interconnected in parallel by two switches H3 when they are switched on.

It must be noted that if the voltage $V_S$ is applied to a terminal of the capacitor $C_1$ then, after the changing of the duty cycle, it will be applied to the terminal opposite to $C_2$ so that a balancing of charges can be done to make a voltage $\Delta V_S$ appear at an output of the unit 64 or 66.

Figure 4:
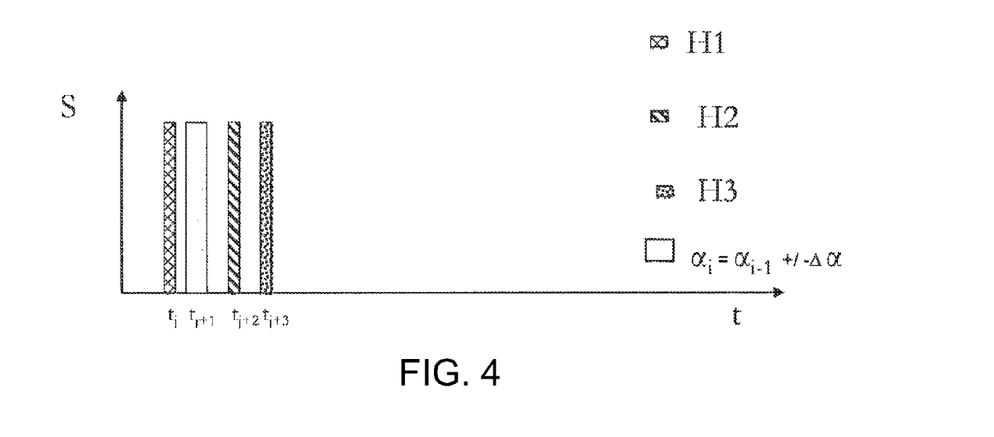
FIG. 4 is a switching timing diagram for the switches of FIG. 3.

Indeed, assuming that C1=C2=C and if we furthermore take account of FIG. 4 showing a timing diagram of the controls of the switches H1, H2 and H3 as well as the changing of the duty cycle of $\alpha_{i+1} = \alpha_i \pm \Delta\alpha$; ($\Delta\alpha > 0$); at the instant $t_j$, the switches H1 are switched to the "on" state and a charge $Q_i = C(2V_{OFFSET} - V^i_S)$ is stored in C1 and then there is a change of duty cycle at the instant $t_{j+1}$.

After a stabiliation time, the switch H2 is closed at the instant $t_{j+2}$ and a charge $Q_{i+1} = C(V^{i+1}_S)$ is stored in C2.

Finally, at the instant $t_{j+3}$, the switches H3 are closed. This results in a balancing of the charges so that the value $$\Delta V_S = (Q_i + Q_{i+1})/2C = V_{OFFSET} + (V^{i+1}_S - V^i_S)/2$$

is obtained at an output.

A description has just been given of a cycle for determining a first voltage differential for two first successive duty cycles ($\alpha_i$, $\alpha_{i+1}$), for example conducted by the unit 64.

The unit 66 works in the same way and the switching of its switches H1 can take place already for the same duty cycle $\alpha_{i+1}$ when the unit 64 has closed its switches H2 and/or H3.

Naturally, since the refresh cycle for the duty cycle is far slower (about 10 Hz) than the chopping cycle (about 100 Hz), the clock generator controlling the chopper circuit 11 is used to control the switches H1, H2 and H3 with appropriate dividers.

The outputs of the units 64 and 66 are connected to corresponding inputs of the comparator 68 for which the output signal corresponds to the sign of the difference $\Delta V^{i+1}_S$ and $\Delta V^i_S$.

To adjust the duty cycle $\alpha$, it is the only piece of information needed for the control unit 53 to increase or diminish the duty cycle $\alpha_{i+2}$ by a predefined quantity $\Delta\alpha$ ($\Delta\alpha>0$), i.e.:

if $(\Delta V^{i+1}_S - \Delta V^i_S) > 0$, then $\alpha_{i+2} = \alpha_{i+1} + \Delta\alpha$; $\Delta\alpha > 0$ if $(\Delta V^{i+1}_S - \Delta V^i_S) < 0$, then $\alpha_{i+2} = \alpha_{i+1} - \Delta\alpha$; $\Delta\alpha > 0$ It can therefore be seen that, by using entirely analog circuits that consume little energy, it is possible to obtain an efficient MPPT control loop and to dispense with the need for a microcontroller.

Thus, the converter circuit 2 oscillates around the maximum power point MPP, thus ensuring harvesting of a maximum of power available at the source.

It can also be noted that the smaller the value of $\Delta\alpha$, the closer to the optimum maximum power point will the circuit be capable of operating. In this case, a higher refresh frequency is chosen to enable faster adaptation of the duty cycle in the event of a change in operating conditions.

Figure 5:
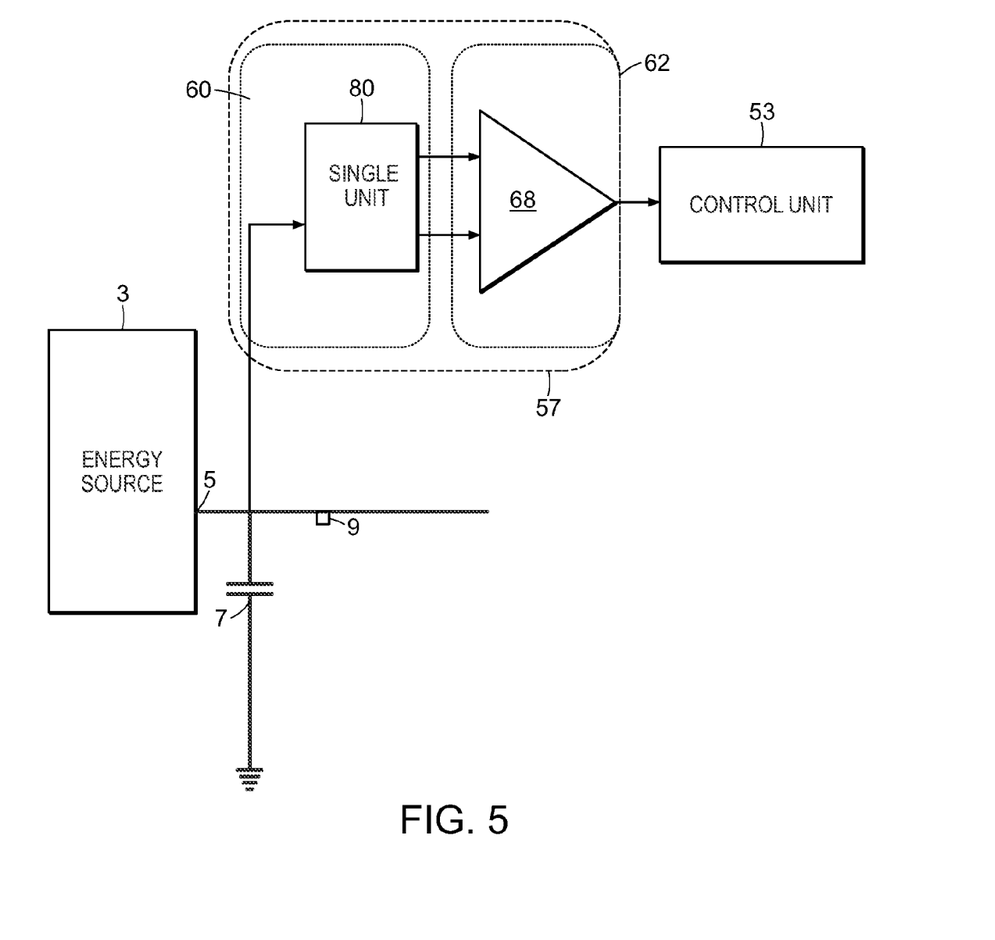
FIG. 5 is a detailed view of the converter circuit of FIG. 1 according to a second embodiment.

We refer now to FIG. 5 which shows details of the converter circuit of FIG. 1 according to a second embodiment.

Figure 6:
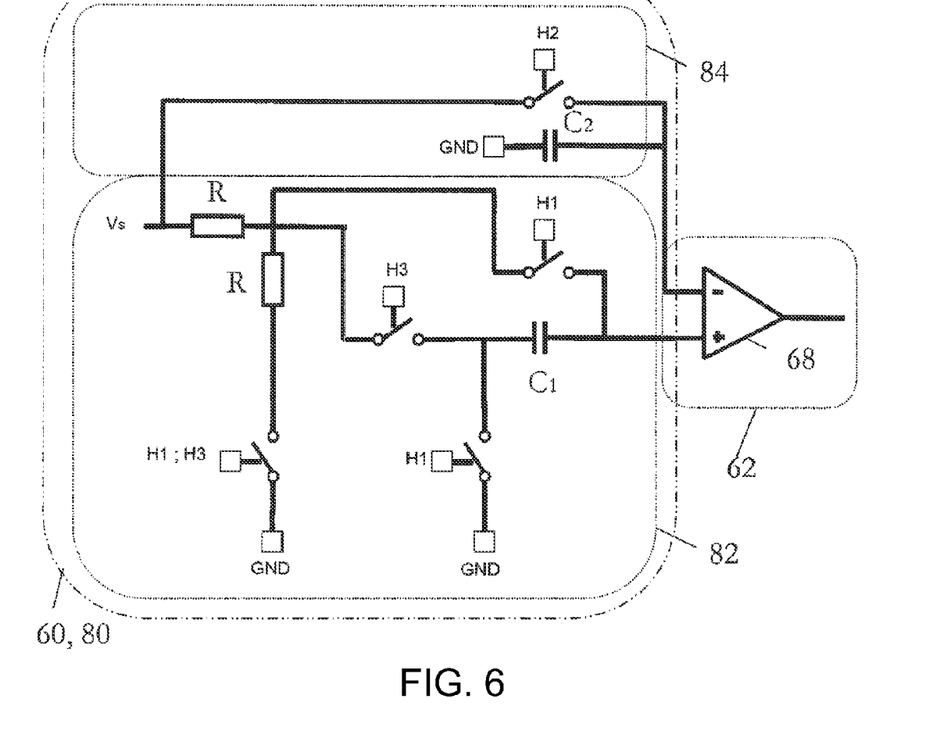
FIG. 6 shows a particular embodiment corresponding to the detailed view shown in FIG. 5 according to a first variant.

According to this embodiment, the means 60 are formed by a single unit 80, an exemplary structure of which is shown in FIG. 6.

The general principle of the circuit of FIGS. 5 and 6 is based on the observation that the voltages $V^{j-1}_S$, $V^j_S$, $V^{j+1}_S$ can be measured for three successive duty cycles respectively $\alpha_{i-1}$; $\alpha_i$ and $\alpha_{i+1}$.

To change the duty cycle, all that is needed is the sign of the progress of the voltage differential between respectively three duty cycles, namely:

$$\text{sign}(\delta V_S) = \text{sign}(\Delta V^j_S - \Delta V^{j-1}_S)$$
$$= \text{sign}((V^{j+1}_S - V^j_S) - (V^j_S - V^{j-1}_S))$$
$$= \text{sign}(V^{j-1}_S + V^{j-1}_S - 2V^j_S)$$

This is done by the circuit of FIG. 6.

Indeed, the means 60 for the analog storage of pieces of information corresponding to output voltages of the electrical energy source for at least three successive duty cycles ($\alpha_{i-1}$, $\alpha_i$, $\alpha_{i+1}$) include a first branch 82 comprising a capacitor configured for the storage, via switches, of the output voltages from the electrical energy source for first and third successive duty cycles ($\alpha_{i-1}$, $\alpha_{i+1}$) and a second branch 84 comprising a capacitor configured for the storage, via switches, of the charges corresponding to the output voltage from the electrical energy source for a second duty cycle ($\alpha_i$), interposed between the first and third duty cycles ($\alpha_{i-1}$, $\alpha_{i+1}$).

Each branch is connected to a corresponding input of the analog comparison unit 62, the weight of the second branch 84 being double that of the first branch 82.

To this end, the first branch 82 is connected for example to the energy source 3 through a divider bridge, for example formed by two resistors R of a same value to divide the voltage $V_S$ by two.

Each branch 82, 84 respectively has a capacitor C1, C2 of a same value.

The capacitor C1 can be connected, via two switches H1 or two switches H3 (one of which is common with H1) when they are switched on, firstly to the output $V_S$ of the energy source 3 and secondly to ground.

It must be noted that when the switches H1 are switched over, the voltage $V_S$ is presented to a first terminal of the capacitor C1 while, when the switch H3 is switched over, the voltage $V_S$ is presented to the opposite terminal of the same capacitor C1 so that after the switching of H1 on the one hand and the switching of H3 on the other hand, the sum of the voltages $V_S$ taken at different points in time is situated at the input of the comparator 68.

The capacitor C2 can be connected, via a switch H2 when it is switched on, firstly to the output $V_S$ of the energy source 3 and secondly to ground GND.

Figure 7:
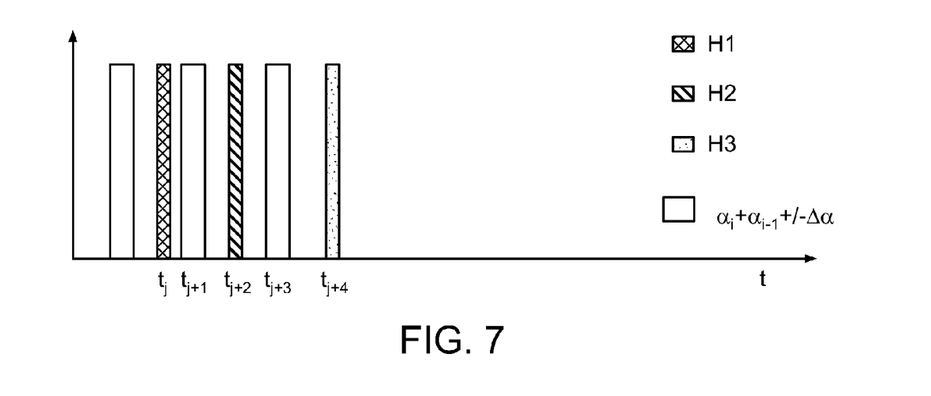
FIG. 7 is a switching timing diagram of the switches of FIG. 6.

For the operation, assuming C1=C2=C, and if we furthermore take account of FIG. 7 which shows a timing diagram of commands of the switches H1, H2 and H3 as well as the change in the duty cycle of $\alpha_{i+1} = \alpha_i \pm \Delta\alpha$; ($\Delta\alpha > 0$); at the instant $t_j$, the switches H1 are switched on and a charge $Q_{i-1} = C(V^{i-1}_s)$ is stored in C1, then there is a change in duty cycle at the instant $t_{j+1}$.

After a stabilization time, the switch H2 is closed at the instant $t_{j+2}$ and a charge $Q_i = C(V^i_S)$ is stored in C2.

Finally, after a new stabilization time, at the instant $t_{j+3}$ the switches H3 are closed, the consequence of which is that, at the input of the comparator 68 for the branch 82, we now have a voltage $(V^{j+1}_S + V^{j-1}_S)/2$ and, at the input of the branch 84, we have a voltage $V^j_S$.

Since the comparator 68 is latched, the switching signal for the switches H3 can be used to validate the output of the comparator 68.

Thus, at the output of the comparator 68, we obtain an output signal corresponding to the sign of the difference $\Delta V^{i+1}_S$ and $\Delta V^i_S$.

The adjustment of the duty cycle $\alpha$ is then done in the same way as described here above for the first embodiment.

Figure 8:
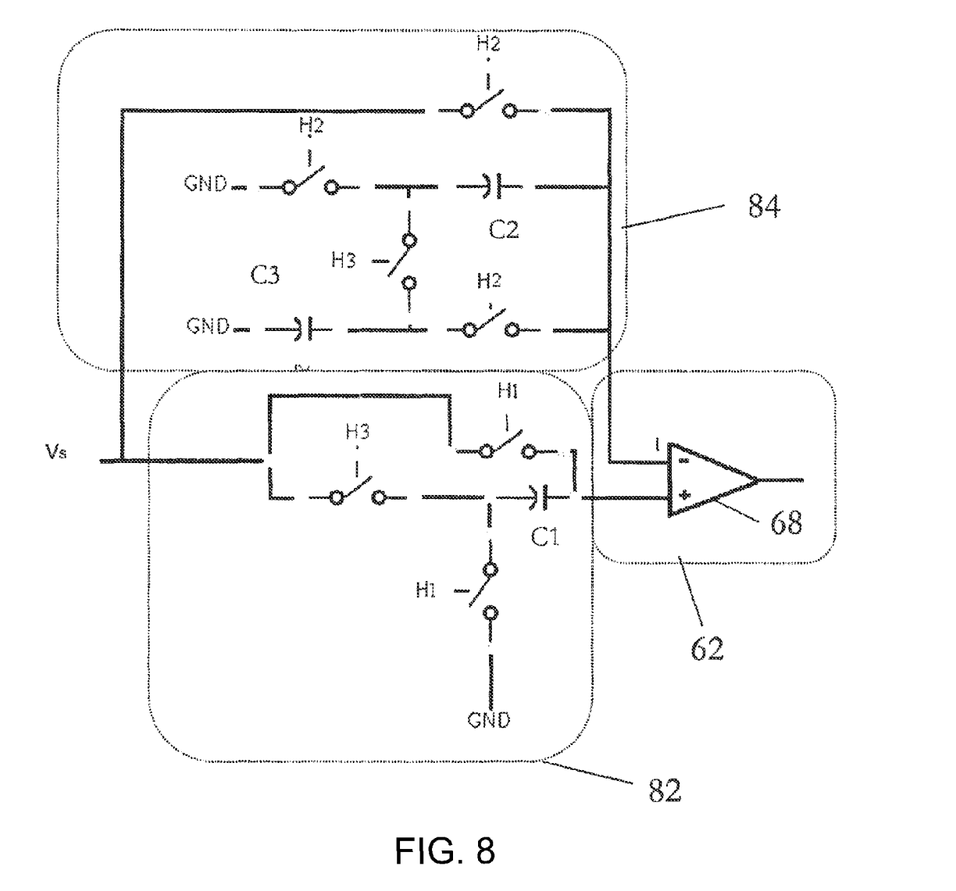
FIG. 8 shows a particular embodiment corresponding to the detailed view of FIG. 5 according to a second variant.

FIG. 8 shows a variant of this embodiment which differs from that of FIG. 6 in that the second branch 84 has a switch circuit to double the charge of the capacitor for the second duty cycle ($\alpha_i$). This variant works with the same timing diagram as that of FIG. 7.

In greater detail, the branch 82 is directly connected to the electrical energy source ($V_S$) while the branch 84 has an additional capacitor C3 as well as switches H3.

For the working of the second branch 84, the closing of the switches H2 makes it possible to charge the capacitors C2 and C3 and then the closing of the switch H3 in this branch 84 results in a situation where the voltage $2V^i$ is at the input of the comparator 68 while, at the other input, there is a voltage $(V^{j+1}_S + V^{j-1}_S)$.

It can be clearly understood that it is possible to have different variants without departing from the scope of the present invention.

Thus, it can be chosen that the capacitor C1, C2, C3 will not have the same values. It is also possible to adapt or add bias voltages in order to take account more efficiently of the response and/or input characteristics of the comparator 68.

The comparator may also be a continuous comparator while the latched comparator works only during the renewal of the sampled values. This makes it possible to reduce the consumption of the unit when these sampling operations are temporally distant (performed at low frequency).

In the architectures and circuits shown, it is quite possible to replace the doubler and divider blocks by classic voltage doubler systems (charge pumps etc.) or known architectures using operational amplifiers.

It can therefore be understood that the converter circuit of the invention has an efficient MPPT control loop of low cost and low energy consumption. These features promote its use especially for small-sized electrical systems.

The invention claimed is:

1. An apparatus comprising a converter circuit to be connected to an electrical energy source capable of showing major fluctuations in delivered power, said circuit comprising: a chopper circuit with a variable duty cycle, said chopper circuit being connectable to said electrical energy source; at least one output circuit adapted for being connected to said chopper circuit; a control loop for tracking a maximum power point of said electrical energy source connected to an output of said energy source; and a control unit configured to command, at predefined intervals, changes in said duty cycle of said chopper circuit as a function of a set-value signal of said control loop;

wherein said control loop includes means for analog storage of pieces of information corresponding to output voltages from said electrical energy source for at least three successive duty cycles; and an analog comparison unit delivering an output, as a function of said stored pieces of information, and a set-value signal for increasing or reducing of said duty cycle by said control unit.

2. The apparatus of claim 1, wherein said means for analog storage comprises: a first unit for determining a voltage differential between output voltages for two successive first duty cycles; and a second unit for determining a voltage differential between output voltages for two second duty cycles, wherein at least one of said two second successive duty cycles is subsequent to said first successive duty cycles.

3. The apparatus of claim 2, wherein each of said first and second units comprises: at least one first branch and one second branch parallel to said first branch, each branch including a capacitor and being connectable via at least one switch to said output of said energy source, said capacitors being capable of being parallel-connected for a balancing of charges and providing said differential voltage for two successive duty cycles.

4. The apparatus of claim 1, wherein said means for analog storage comprises: a first branch including a capacitor configured for storage, via switches, of first and third output voltages from said electrical energy source for first and third successive duty cycles of said at least three successive duty cycles, and a second branch including a capacitor configured for the storage, via switches, of charges corresponding to a second output voltage of said electrical energy source for a second duty cycle interposed between said first and third duty cycles, each branch being connected to a corresponding input of said analog comparison unit, a weight of said second branch being double a weight of said first branch.

5. The apparatus of claim 4, wherein said first branch is connected to said energy source via a divider bridge.

6. The apparatus of claim 4, wherein said second branch comprises a switched circuit to double said charge of said capacitor for said second duty cycle.

7. The apparatus of claim 1, wherein said analog comparison unit comprises an operational amplifier configured as a comparator.

8. The apparatus of claim 1, wherein said control loop is configured to determine said voltages at said output of said energy source after a predefined stabilization time following a change in said duty cycle.

9. The apparatus of claim 1, wherein said control unit further comprises means for controlling a change in said duty cycle by a quantity predefined as a function of said set-value signal of said control loop.

10. The apparatus of claim 1, wherein said control unit is configured to command an increase in said duty cycle by a predefined quantity when said set-value signal has a positive polarity.

11. The apparatus of claim 1, wherein said control unit is configured to command a decrease in said duty cycle by a predefined quantity if said set-value signal has a negative polarity.

12. The apparatus of claim 1, wherein said control unit consists of only logic blocks.

13. The apparatus of claim 1, further comprising an electrical energy source capable of showing major fluctuations, said converter circuit being connected to said energy source.

14. The apparatus of claim 13, wherein said source comprises a photovoltaic cell.

15. The apparatus of claim 13, wherein said source comprises a wind-powered turbine.

16. The apparatus of claim 13, wherein said source comprises a thermo-electric element.

* * * * *